US012639364B2

(12) United States Patent
Wilkinson

(10) Patent No.: US 12,639,364 B2
(45) **Date of Patent: *May 26, 2026**

(54) INDEXING FINGERPRINTS

(71) Applicant: Gracenote, Inc., Emeryville, CA (US)

(72) Inventor: Matthew James Wilkinson, Emeryville, CA (US)

(73) Assignee: Gracenote, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/740,241

(22) Filed: Jun. 11, 2024

(65) Prior Publication Data

US 2024/0330356 A1 Oct. 3, 2024

Related U.S. Application Data

(63) Continuation of application No. 17/901,726, filed on Sep. 1, 2022, now Pat. No. 12,045,277, which is a
(Continued)

(51) Int. Cl.
*G06F 16/44* (2019.01)
*G06F 16/41* (2019.01)
(Continued)

(52) U.S. Cl.
CPC .............. *G06F 16/44* (2019.01); *G06F 16/41* (2019.01); *G06F 16/48* (2019.01); *H04N 21/84* (2013.01)

(58) Field of Classification Search
CPC .. H04N 21/44008; H04N 21/84; G06F 16/44; G06F 16/41; G06F 16/48
See application file for complete search history.

(56) References Cited

U.S. PATENT DOCUMENTS 7,240,207 B2 7/2007 Weare
8,069,176 B1 * 11/2011 Ioffe ...................... G06V 20/48
707/747
(Continued)

FOREIGN PATENT DOCUMENTS

KR 20130055115 5/2013
KR 101286862 7/2013
WO 2010135082 11/2010

OTHER PUBLICATIONS

Haitsma, et al., "A Highly Robust Audio Fingerprinting System," ISMIR, 2002, 9 pages.
(Continued)

*Primary Examiner* — Tony Wu
(74) *Attorney, Agent, or Firm* — McDonnell Boehnen Hulbert & Berghoff LLP

(57) ABSTRACT

Example methods and systems for indexing fingerprints are described. Fingerprints may be made up of sub-fingerprints, each of which corresponds to a frame of the media, which is a smaller unit of time than the fingerprint. In some example embodiments, multiple passes are performed. For example, a first pass may be performed that compares the sub-fingerprints of the query fingerprint with every thirty-second sub-fingerprint of the reference material to identify likely matches. In this example, a second pass is performed that compares the sub-fingerprints of the query fingerprint with every fourth sub-fingerprint of the likely matches to provide a greater degree of confidence. A third pass may be performed that uses every sub-fingerprint of the most likely matches, to help distinguish between similar references or to identify with greater precision the timing of the match. Each of these passes is amenable to parallelization.

20 Claims, 9 Drawing Sheets

Related U.S. Application Data continuation of application No. 16/811,626, filed on Mar. 6, 2020, now Pat. No. 11,436,271, which is a continuation of application No. 15/445,615, filed on Feb. 28, 2017, now Pat. No. 10,606,879.

(60) Provisional application No. 62/301,372, filed on Feb. 29, 2016.

(51) Int. Cl.
*G06F 16/48* (2019.01)
*H04N 21/84* (2011.01)

(56) References Cited

U.S. PATENT DOCUMENTS

| | | | |
|---|---|---|---|
| 8,165,414 B1 | 4/2012 | Yagnik | |
| 8,290,425 B2 | 10/2012 | Albrett | |
| 8,364,703 B2 | 1/2013 | Ramanathan et al. | |
| 8,411,977 B1 | 4/2013 | Baluja et al. | |
| 8,594,392 B2 | 11/2013 | Bilobrov | |
| 8,660,296 B1 | 2/2014 | Loffe | |
| 8,838,609 B1 | 9/2014 | Sharifi et al. | |
| 9,143,784 B2 | 9/2015 | Yagnik et al. | |
| 9,158,842 B1 | 10/2015 | Yagnik et al. | |
| 9,286,902 B2 | 3/2016 | Han et al. | |
| 9,438,940 B2 | 9/2016 | Nelson | |
| 9,558,407 B1 | 1/2017 | McSorley | |
| 9,684,715 B1 | 6/2017 | Ross et al. | |
| 10,606,879 B1 | 3/2020 | Wilkinson | |
| 2006/0013451 A1 | 1/2006 | Haitsma | |
| 2007/0192087 A1* | 8/2007 | Kim | G06F 16/634 707/E17.101 |
| 2007/0250716 A1 | 10/2007 | Brunk et al. | |
| 2008/0263360 A1 | 10/2008 | Haitsma et al. | |
| 2009/0290764 A1 | 11/2009 | Fiebrink et al. | |
| 2010/0205174 A1 | 8/2010 | Jiang | |
| 2010/0257129 A1 | 10/2010 | Lyon et al. | |
| 2011/0022633 A1 | 1/2011 | Bemosky et al. | |
| 2011/0078754 A1 | 3/2011 | Howcroft et al. | |
| 2011/0116719 A1* | 5/2011 | Bilobrov | G06V 20/40 382/217 |
| 2011/0153417 A1 | 6/2011 | Bemosky | |
| 2012/0011128 A1 | 1/2012 | He | |
| 2012/0116883 A1 | 5/2012 | Asam et al. | |
| 2012/0173552 A1 | 7/2012 | Zhu et al. | |
| 2012/0215329 A1 | 8/2012 | Jiang et al. | |
| 2013/0197913 A1 | 8/2013 | Bilobrov | |
| 2013/0279740 A1 | 10/2013 | Bauer et al. | |
| 2013/0345840 A1 | 12/2013 | Lempel et al. | |
| 2014/0195548 A1 | 7/2014 | Harron | |
| 2014/0280265 A1 | 9/2014 | Wang | |
| 2014/0280304 A1* | 9/2014 | Scherf | G06F 16/683 707/769 |
| 2015/0007318 A1 | 1/2015 | Van De Van | |
| 2016/0124966 A1 | 5/2016 | Cohen | |
| 2016/0148620 A1 | 5/2016 | Bilobrov | |
| 2016/0217799 A1 | 7/2016 | Han et al. | |
| 2017/0118538 A1 | 4/2017 | Ashbacher | |
| 2017/0155933 A1 | 6/2017 | Del Strother | |
| 2020/0210470 A1 | 7/2020 | Wilkinson | |

OTHER PUBLICATIONS

Kiao, "A Study on Music Retrieval Based on Audio Fingerprinting," Department of Information Science and Intelligent Systems Graduate School of Advanced Technology and Science, Sep. 2013, 78 pages.

Baluja, et al, "Audio Fingerprinting: Combining Computer Vision & Data Stream Processing," Google, Inc. 2007, 4 pages.

Bhatia, et al., "An Efficient Hash Count Indexing and Searching Scheme for Audio Fingerprinting," International Journal of Science and Research (IJSR), vol. 3, Issue 9, Sep. 2014, 6 pages.

Rafii, "Audio Fingerprinting—EECS 352: Machine Perception of Music & Audio,"2014, 50 pages.

Lee, et al, "Robust Video Fingerprinting for Content-Based Video Identification," IEEE Transaction on Circuits and Systems for Video Technology, vol. 18, No. 7, Jul. 2008, 6 pages.

Esmaeili, et al., "A Robust and Fast Video Copy Detection System Using Content=Based Fingerprinting," IEEE Transactions on Information Forensics and Security, vol. 6, No. 1, Mar. 2011, 14 pages.

Liu, et al., "DCT Based Multiple Hashing Technique for Robust Audio Fingerprinting," School of Electrical Engineering and INMC, Apr. 2009, 4 pages.

United States Patent and Trademark Office, "Non-Final Office Action," issued in connection with U.S. Appl. No. 15/445,615, mailed Dec. 3, 2018, 13 pages.

United States Patent and Trademark Office, "Final Office Action," issued in connection with U.S. Appl. No. 15/445,615, mailed Jul. 3, 2019, 15 pages.

United States Patent and Trademark Office, "Notice of Allowance and Fee(s) Due,," issued in connection with U.S. Appl. No. 15/445,615, mailed Nov. 22, 2019, 8 pages.

United States Patent and Trademark Office, "Non-Final Office Action," issued in connection with U.S. Appl. No. 16/811,626, mailed May 12, 2021, 12 pages.

United States Patent and Trademark Office, "Final Office Action," issued in connection with U.S. Appl. No. 16/811,626, mailed Nov. 22, 2021, 15 pages.

United States Patent and Trademark Office, "Notice of Allowance and Fee(s) Due," issued in connection with U.S. Appl. No. 16/811,626, mailed May 2, 2022, 8 pages.

* cited by examiner

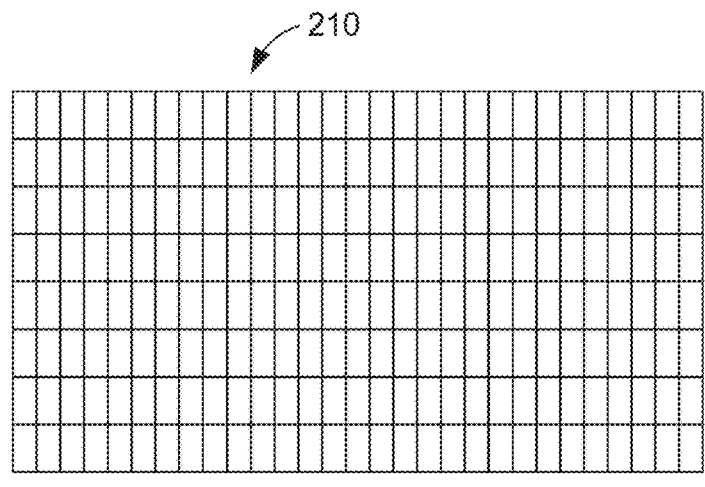
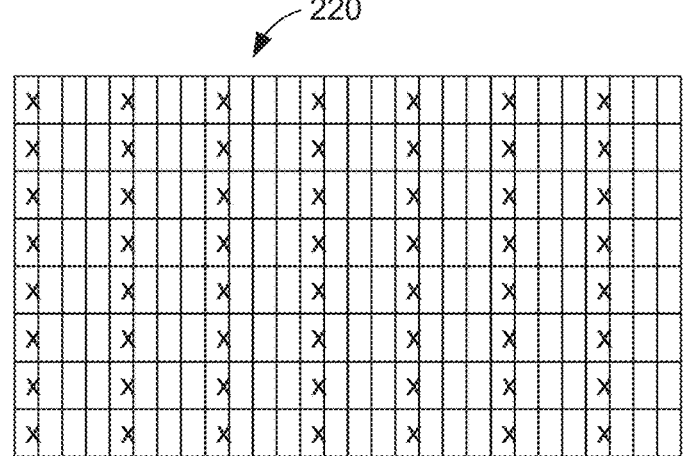
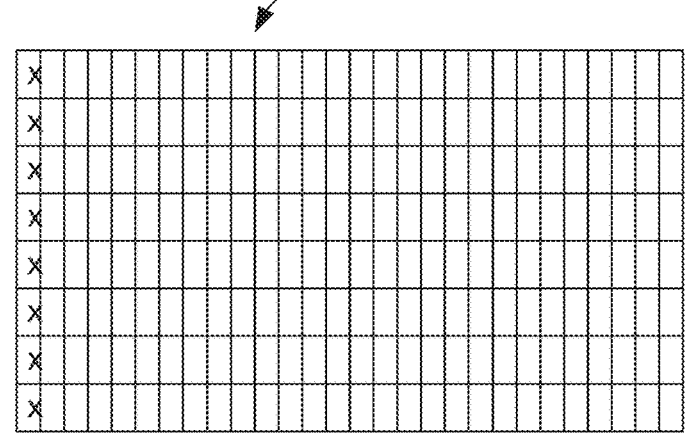
*FIG. 2*

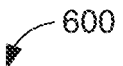

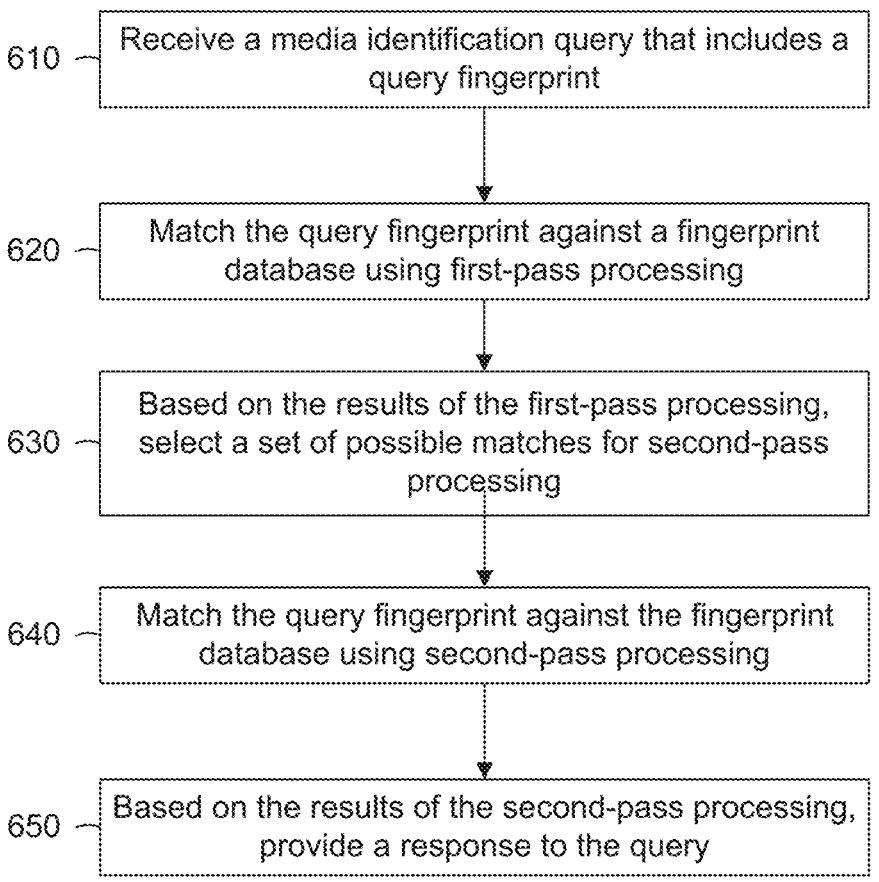

610 — Receive a media identification query that includes a query fingerprint

620 — Match the query fingerprint against a fingerprint database using first-pass processing 630 — Based on the results of the first-pass processing, select a set of possible matches for second-pass processing 640 — Match the query fingerprint against the fingerprint database using second-pass processing 650 — Based on the results of the second-pass processing, provide a response to the query

*FIG. 6*

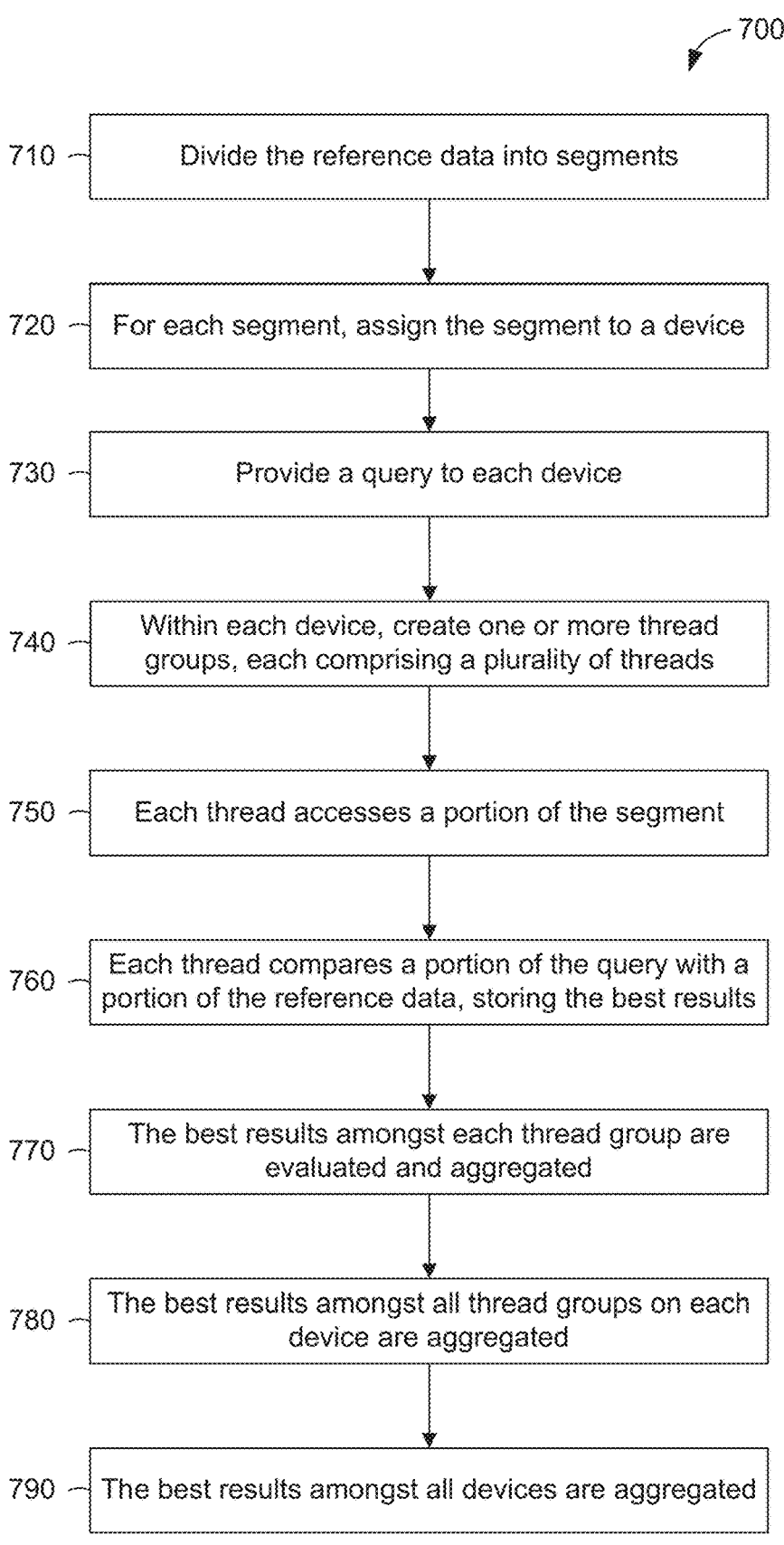

710 — Divide the reference data into segments

720 — For each segment, assign the segment to a device

730 — Provide a query to each device

740 — Within each device, create one or more thread groups, each comprising a plurality of threads 750 — Each thread accesses a portion of the segment 760 — Each thread compares a portion of the query with a portion of the reference data, storing the best results 770 — The best results amongst each thread group are evaluated and aggregated 780 — The best results amongst all thread groups on each device are aggregated 790 — The best results amongst all devices are aggregated

*FIG. 7*

INDEXING FINGERPRINTS

RELATED APPLICATIONS

This patent arises from a continuation of U.S. patent application Ser. No. 17/901,726, filed on Sep. 1, 2022, which is a continuation of U.S. patent application Ser. No. 16/811, 626, now U.S. Pat. No. 11,436,271, filed on Mar. 6, 2020, which is a continuation of U.S. patent application Ser. No. 15/445,615, now U.S. Pat. No. 10,606,879, filed on Feb. 28, 2017, which claims the benefit of U.S. Provisional Patent Application No. 62/301,372, which was filed on Feb. 29, 2016. U.S. patent application Ser. No. 16/811,626, U.S. patent application Ser. No. 15/445,615, and U.S. Provisional Patent Application No. 62/301,372 are hereby incorporated herein by reference in their entirety. Priority to U.S. patent application Ser. No. 16/811,626, U.S. patent application Ser. No. 15/445,615, and U.S. Provisional Patent Application No. 62/301,372 is hereby claimed.

TECHNICAL FIELD

The subject matter disclosed herein generally relates to the processing of data. Specifically, the present disclosure addresses systems and methods to identify media by matching fingerprints.

BRIEF DESCRIPTION OF THE DRAWINGS

Some embodiments are illustrated by way of example and not limitation in the figures of the accompanying drawings.

FIG. 2 illustrates subsampling of fingerprints, according to some example embodiments.

FIG. 6 is a flowchart illustrating a process, in some example embodiments, for indexing fingerprints.

FIG. 7 is a flowchart illustrating a process, in some example embodiments, for indexing fingerprints.

DETAILED DESCRIPTION

Figure 1:
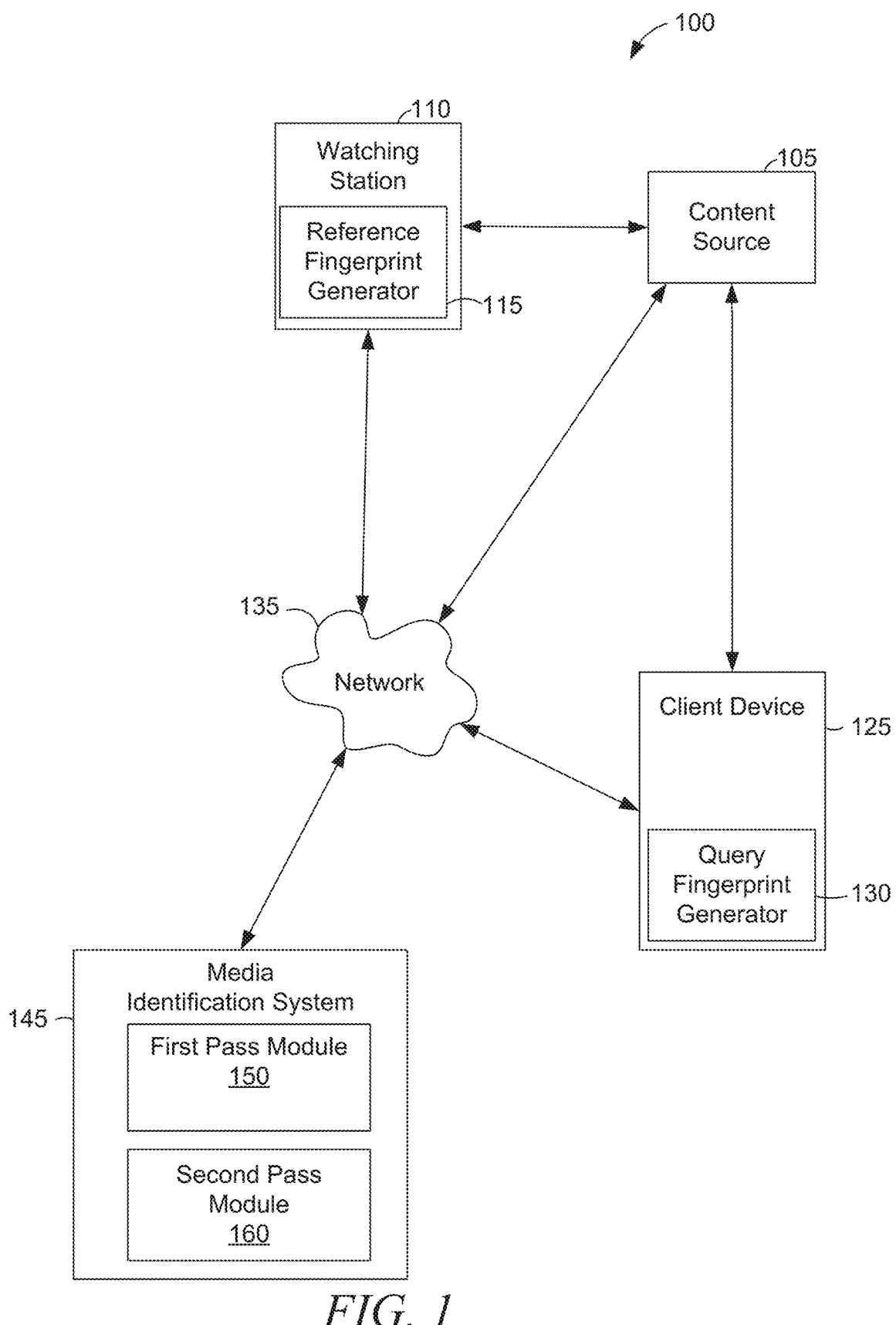
FIG. 1 is a block diagram depicting a network environment, in an example embodiment, for indexing fingerprints.

Example methods and systems for indexing fingerprints are described. In some example embodiments, a client device (e.g., a smart television (TV), a radio, or a media player) generates a fingerprint of media being played. The client device transmits the fingerprint to a media identification system, which identifies the media based on the fingerprint. Based on the identified media content, the client device performs an appropriate action. For example, a replacement video stream showing a particular local commercial may be selected to replace an original video stream showing a particular national commercial. As another example, information regarding the identified media may be presented to the user.

The fingerprint may be made up of sub-fingerprints, each of which corresponds to a frame of the media, which is a smaller unit of time than the fingerprint. The term "frame" here does not necessarily refer to a single image in a video stream, but instead to the particular portion of a media stream represented by a particular sub-fingerprint. In some example embodiments, each sub-fingerprint is a 32-bit value that corresponds to a 300 ms period. The set of sub-fingerprints in a fingerprint may represent overlapping time values. For example, each sub-fingerprint may be offset by 11.61 ms from the sub-fingerprint before it. Accordingly, in a fingerprint made up of 512 sub-fingerprints, the entire fingerprint represents approximately 6.3 s and a perfect match would pinpoint the location of the 6.3 s to within 11.61 ms of the reference material.

In a brute force implementation, the media identification system compares the received fingerprint with each possible fingerprint in a fingerprint database. The cost of a brute force implementation is high. For example, if the media database comprises 100,000,000 3-minute songs, that's the equivalent of 570 years of music. At the same time, if the accuracy of each fingerprint is 11 ms, the number of comparisons required is of the order of 1.6 trillion. Additionally, a matching fingerprint is rarely a perfect match. Instead, a bit error rate (BER) for partially-matching fingerprints is determined and further processing is required to determine the best match. This further increases the computational cost.

Another possible implementation makes use of look up tables. In this implementation, the set of references including each 32-bit sub-fingerprint is identified, allowing that set of references to be looked up based on a sub-fingerprint value in the query. Assuming a random distribution of sub-fingerprints, this divides the number of comparisons by $2^{32}$. However, due to potential bit errors in the sub-fingerprints, results are improved by checking each sub-fingerprint in the query fingerprint, increasing the number of comparisons by a factor equal to the fingerprint size (e.g., 256 or 512). In some example embodiments, even more look ups are performed. For example, to compensate for an additional bit error in each sub-fingerprint, every bit in each sub-fingerprint should be toggled. As a simplified example, this means that if the key were 1101, then look ups would be performed on 1101, 0101, 1001, 1111, and 1100. Accordingly, for 32-bit sub-fingerprints, 33 look ups for each sub-fingerprint would be performed. In another example embodiment, a 32-bit mask of weak bits is supplied for each 32-bit sub-fingerprint. The 32-bit mask indicates which 14 of the 32 bits in the sub-fingerprint that have the lowest confidence value. Instead of just checking the single 32-bit value in the sub-fingerprint, all $2^{14}$ possible permutations of the weak bits are checked. Thus, the $2^{32}$ improvement is reduced by 512 ($2^9$) and $2^{14}$, netting about a $2^9$ reduction in comparisons. Additionally, the random-access nature of the look up table approach makes division and optimization of the process difficult.

As noted above, sub-fingerprints are frequently derived from substantially overlapping windows of time. As a result, attempting to match a sub-fingerprint of the query with a reference sub-fingerprint that is slightly offset will likely have a lower BER than attempting to match the sub-fingerprint of the query with an unrelated reference sub-fingerprint. Taking advantage of this, comparisons may be performed against a subset of the reference sub-fingerprints while still providing information as to whether or not the reference is a likely match. In some example embodiments, every fourth or every thirty-second sub-fingerprint is used for comparison. This may be accomplished by storing all sub-fingerprints and skipping intervening values or by storing sub-samples of the value and accessing each value.

In some example embodiments, multiple passes are performed. For example, a first pass may be performed that compares the sub-fingerprints of the query fingerprint with every thirty-second sub-fingerprint of the reference material to identify likely matches. In this example, a second pass is performed that compares the sub-fingerprints of the query fingerprint with every fourth sub-fingerprint of the likely matches to provide a greater degree of confidence. A third pass may be performed that uses every sub-fingerprint of the most likely matches, to help distinguish between similar references or to identify with greater precision the timing of the match.

Each of these passes is amenable to parallelization. In some example embodiments, the reference fingerprints are down-sampled (e.g., by a factor of 32) and divided between multiple servers. Each server is responsible for determining the best match reference fingerprints for the query fingerprint from among the reference fingerprints assigned to the server. Once all servers have completed their portion of the search, the results are aggregated to determine the best overall matches. Other levels of sub-sampling may also be stored on the servers. For example, a server may have a 32× down-sampled copy of the reference fingerprints for initial scanning and a 4× down-sampled copy of the reference fingerprints for validation.

Similarly, the process of sub-fingerprint comparison on each server may be parallelized. For example, in servers with 16,384 graphical processing unit (GPU) cores, each GPU core may be assigned a particular subset of the sub-fingerprints of the reference to compare with the sub-fingerprints of the query. Accordingly, 16,384 comparisons may be performed simultaneously on each server, substantially reducing the amount of time required to complete the first pass.

In the following description, for purposes of explanation, numerous specific details are set forth to provide a thorough understanding of example embodiments. It will be evident to one skilled in the art, however, that the present subject matter may be practiced without these specific details.

FIG. 1 is a network diagram illustrating a network environment 100 suitable for indexing fingerprints, according to some example embodiments. The network environment 100 may include a watching station 110 that receives video and other multimedia content from a content source 105, such as a broadcaster, web server, and so on. For example, the content source 105 may be a broadcaster, such as television station or television network, which streams or transmits media over a television channel to the watching station 110, and/or a web service, such as a website, that streams or transmits media over a network 135 to the watching station 110, among other things. The watching station 110 includes a reference fingerprint generator 115 that generates reference fingerprints of media content received from the content source 105.

A client device 125 is any device capable of receiving and presenting a stream of media content (e.g., a television, second set-top box, a laptop or other personal computer (PC), a tablet or other mobile device, a digital video recorder (DVR), or a gaming device). In some example embodiments, the client device 125 generating the query fingerprint is distinct from the device receiving and presenting the media stream. For example, the client device 125 may be a smart phone of a user that captures ambient audio from a car radio or a night club.

The client device 125 may also include a display or other user interface configured to display the processed stream of media content. The display may be a flat-panel screen, a plasma screen, a light emitting diode (LED) screen, a cathode ray tube (CRT), a liquid crystal display (LCD), a projector, and so on.

The network 135 may be any network that enables communication between devices, such as a wired network, a wireless network (e.g., a mobile network), and so on. The network 135 may include one or more portions that constitute a private network (e.g., a cable television network or a satellite television network), a public network (e.g., over-the-air broadcast channels or the Internet), and so on.

In some example embodiments, a media identification system 145 communicates with the watching station 110 and the client device 125 over the network 135. The media identification system 145 may receive a query fingerprint generated by the query fingerprint generator 130 of the client device 125, such as a fingerprint of a frame or block of frames within the media content, and query an index of known reference fingerprints generated by the reference fingerprint generator 115 of the watching station 110, in order to identify the media content by matching the query fingerprint with one or more reference fingerprints. The media identification system 145 may respond to media identification requests from millions of query fingerprint generators 130. The reference fingerprints and query fingerprints may be Philips audio fingerprints.

Upon identifying the media content, the media identification system 145 may return an identifier for replacement content (e.g., alternative programming, alternative commercials, and so on) associated with the media content to the client device 150. Additionally or alternatively, the media identification system 145 may return an identifier representing the identified media content, suitable for requesting and presenting additional information regarding the identified media content (e.g., title, artist, year released, rating, or any suitable combination thereof). Using the identifier, the client device 125 may access the replacement content or provide information regarding the media.

As shown in FIG. 1, the media identification system 145 comprises a first pass module 150 and a second pass module 160 configured to communicate with each other (e.g., via a bus, shared memory, or a switch). In some example embodiments, the first pass module 150 is implemented on a plurality of graphics processing units (GPUs) and the second pass module 160 is implemented on one or more central processing units (CPUs). One or more of the modules described herein may be implemented using hardware (e.g., a processor of a machine, a field-programmable gate array (FPGA), or an application-specific integrated circuit (ASIC)) or a combination of hardware and software (e.g., a processor configured by software). Moreover, any two or more of these modules may be combined into a single module, and the functions described herein for a single module may be subdivided among multiple modules.

Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 8. As used herein, a "database" is a data storage resource and may store data structured as a text file, a table, a spreadsheet, a relational database, a document store, a key-value store, a triple store, or any suitable combination thereof. Moreover, any two or more of the machines illustrated in FIG. 1 may be combined into a single machine, and the functions described herein for any single machine may be subdivided among multiple machines.

Furthermore, any of the modules, systems, and/or generators may be located at any of the machines, databases, or devices shown in FIG. 1. For example, the media identification system 145 may include the query fingerprint generator 130 and frames of media content from the client device 125, and generate the query fingerprints using the included query fingerprint generator 130, among other configurations.

FIG. 2 illustrates subsampling of fingerprints, according to some example embodiments. The fingerprint 210 includes 256 sub-fingerprints, each represented by a small box. The 4× subsampled fingerprint 220 includes 64 sub-fingerprints, each represented by a box marked with an x, corresponding to the box of the fingerprint 210 in the corresponding position. The 32× subsampled fingerprint 230 includes 8 sub-fingerprints, also each represented by a box marked with an x that corresponds to the box of the fingerprint 210 in the corresponding position.

Figure 3:
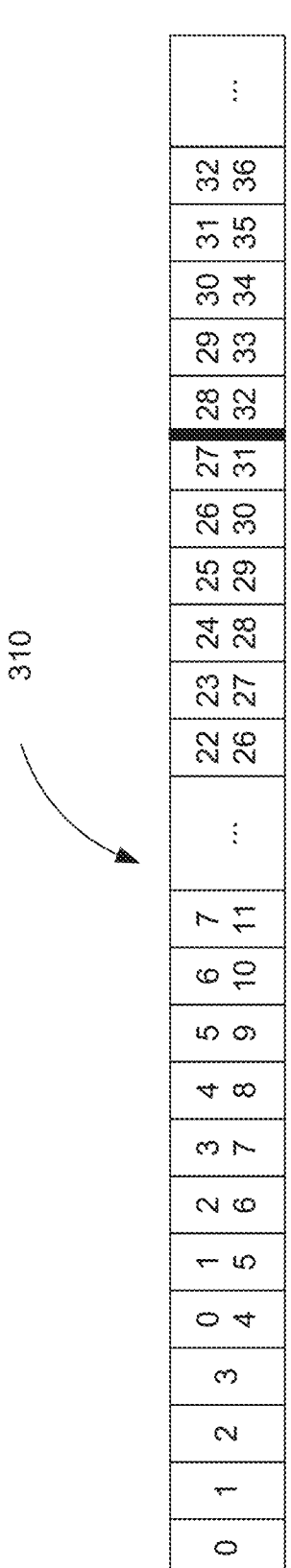
FIG. 3 is a block diagram illustrating memory access of a data segment by threads, according to some example embodiments.

FIG. 3 is a block diagram illustrating memory access of a data segment by threads, according to some example embodiments. In some example embodiments, groups of threads form a warp. Data belonging to threads within a warp can be shared with other threads in the warp with a high degree of efficiency. In the example embodiment of FIG. 3, 1024 threads are accessing 1028 memory locations of the data segment. Threads 0-31 access the locations 0-35, threads 32-63 access the locations 32-67 and so on, with threads 991-1023 accessing the last 36 locations. The dark border between the locations numbered 31 and 32 indicates a boundary between sub-fingerprints used as the first position for comparison by two separate warps.

Figure 4:
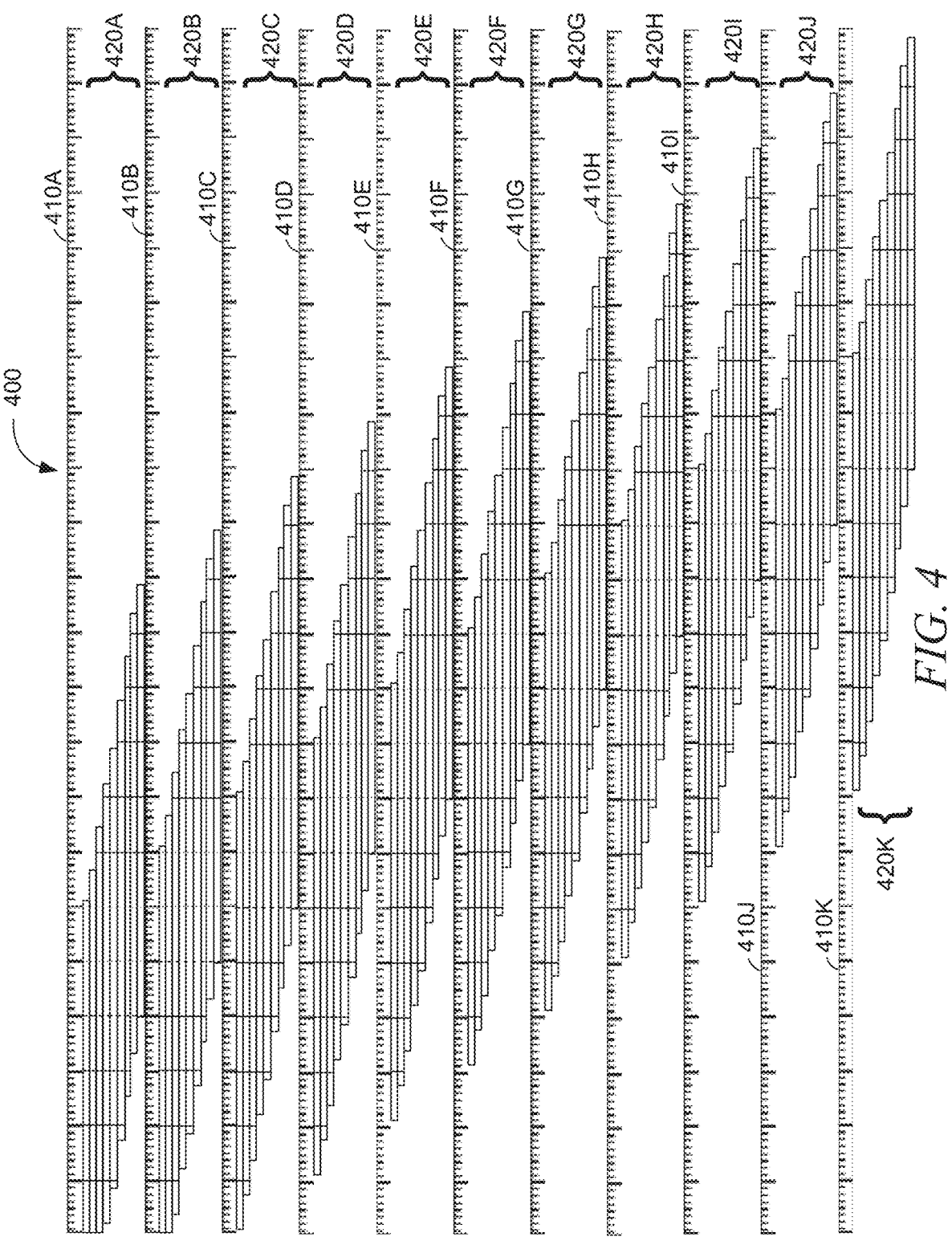
FIG. 4 is a block diagram illustrating sub-fingerprint comparisons by threads, according to some example embodiments.

FIG. 4 is a block diagram 400 illustrating sub-fingerprint comparisons by threads, according to some example embodiments. FIG. 4 shows 11 threads, each performing one scan. The rows 410A, 410B, 410C, 410D, 410E, 410F, 410G, 410H, 410I, 410J, and 410K show the organization of data. The small hash marks in the rows 410A-410K show 4× sub-sampling. The large hash marks in the rows 410A-410K show 32× sub-sampling. Thus, in some example embodiments, reference data is available only along the large hash marks and query sub-fingerprints are available for every position (i.e., without sub-sampling). Each large row 420A, 420B, 420C, 420D, 420E, 420F, 420G, 420H, 420I, 420J, and 420K shows the comparisons made by a single thread. The rows 420A-420K are divided into nine smaller rows, corresponding to nine comparisons made in a scan. In each of the smaller rows, the rectangle represents the alignment of the query fingerprint with the reference data. Thus, as can be seen in the figure, each thread is operating at a different position in the reference data, though the positions overlap. As discussed above with respect to FIG. 3, 1024 threads may be operating in parallel. In that case, FIG. 4 shows only a small subset of the processing.

The vertical solid lines across the rectangles indicate the alignment of the rectangles with the 32× sub-sampling hash marks of the rows 410A-410K. The vertical dashed lines show the first position of the reference data being used for comparison with the query fingerprint; the vertical dotted lines show the other positions being used. Thus, the figure shows that each of the nine comparisons performed by each thread are against the same three values for the thread and no thread has the same three values as any other thread. Additionally, the portion of the query fingerprint that is compared shifts from the end of the fingerprint to the beginning over the course of the nine comparisons. For example, the first row of the first thread shows the last dotted line at the end of the query fingerprint and the last row of the first thread shows the dashed line at the beginning of the query fingerprint. Since the dashed line and last dotted line are 64 samples apart and the query fingerprint is 256 sub-fingerprints long, the comparisons are shifted approximately 192 positions (e.g., in some example embodiments the comparisons are shifted by 189 positions) over eight steps, or about 24 positions per step (6 memory locations, if the query is already 4× sub-sampled).

Figure 5:
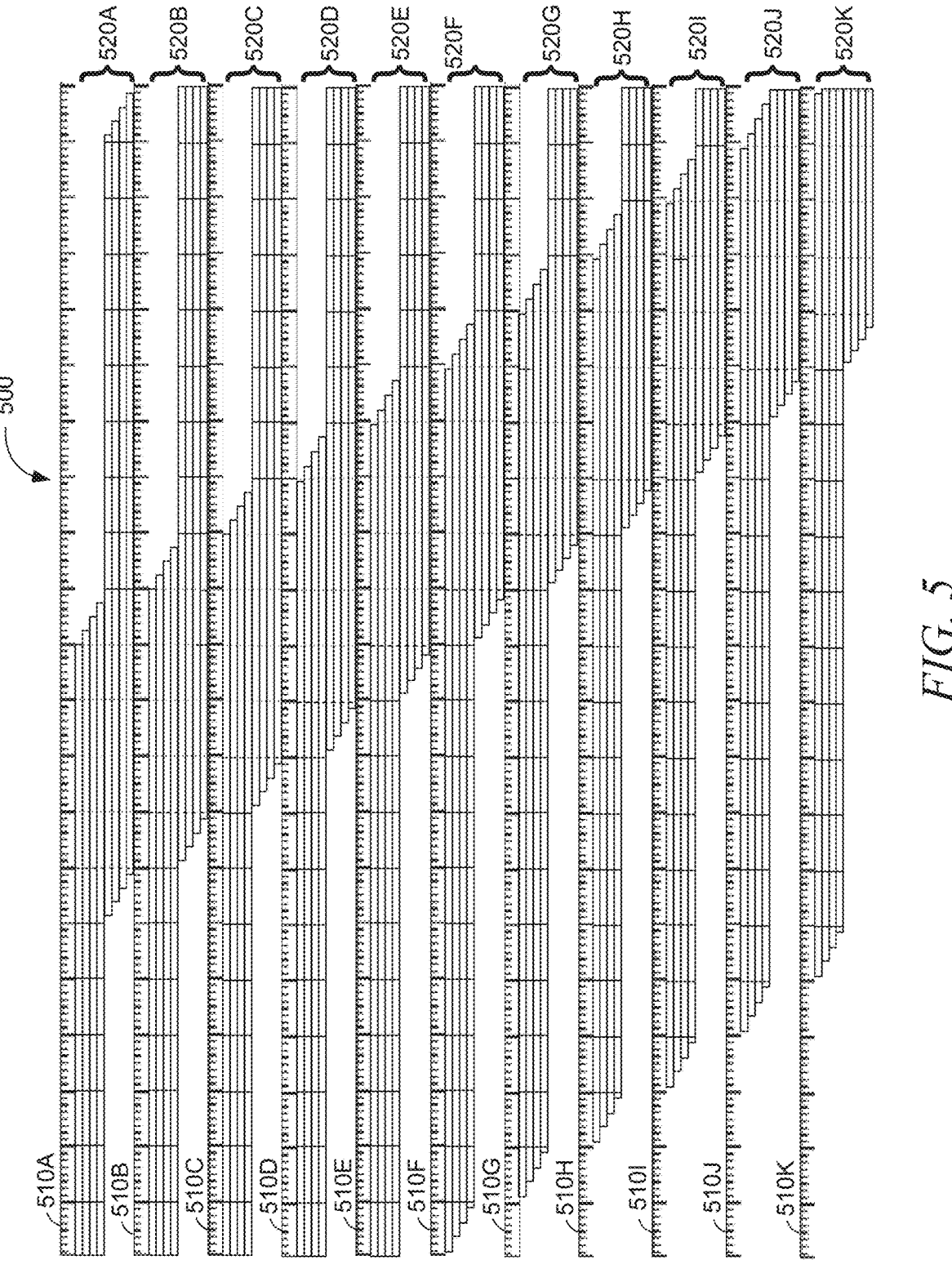
FIG. 5 is a block diagram illustrating sub-fingerprint comparisons by threads, according to some example embodiments.

FIG. 5 is a block diagram 500 illustrating sub-fingerprint comparisons by threads, according to some example embodiments. FIG. 5 shows 11 threads, each performing one scan. The rows 510A, 510B, 510C, 510D, 510E, 510F, 510G, 510H, 510I, 510J, and 510K show the organization of data. The small hash marks in the rows 510A-510K show 4× sub-sampling. The large hash marks in the rows 510A-510K show 32× sub-sampling. Thus, in some example embodiments, reference data is available only along the large hash marks and query sub-fingerprints are available for every position (i.e., without sub-sampling). Each large row 520A, 520B, 520C, 520D, 520E, 520F, 520G, 520H, 520I, 520J, and 520K shows the comparisons made by a single thread. The rows 520A-520K are divided into eight smaller rows, corresponding to eight comparisons made in a scan. In each of the smaller rows, the rectangle represents the alignment of the query fingerprint with the reference data. Thus, as can be seen in the figure, each thread is operating at a different position in the reference data, though the positions overlap. As discussed above with respect to FIG. 3, 1024 threads may be operating in parallel. In that case, FIG. 5 shows only a small subset of the processing.

The vertical solid lines across the rectangles indicate the alignment of the rectangles with the 32× sub-sampling hash marks of the rows 510A-510K. The vertical dashed lines show the first position of the reference data being used for comparison with the query fingerprint; the vertical dotted lines show the other positions being used. Thus, the figure shows that each of the eight comparisons performed by each thread are against the same three values for the thread and no thread has the same three values as any other thread. Additionally, the portion of the query fingerprint that is compared shifts from the end of the fingerprint to the beginning over the course of the eight comparisons. For example, the first row of the first thread shows the last dotted line at the end of the query fingerprint and the last row of the first thread shows the dashed line at the beginning of the query fingerprint. Since the dashed line and last dotted line are 128 samples apart and the query fingerprint is 512 sub-fingerprints long, the comparisons are shifted approximately 384 positions (e.g., in some example embodiments the comparisons are shifted by 382 positions) over seven steps. As shown in FIG. 5, the steps between the first group of four threads (as indicated by the top four rectangles of each row 520A-520K) are small and the steps between the last group of four threads (as indicated by the bottom four rectangles of each row 520A-520K) are small, but the step between the two groups is large. In this way, the beginning portion of each query fingerprint is compared to the reference sub-fingerprints in four different alignments and the end portion of each query fingerprint is compared to the reference sub-fingerprints in four different alignments. In some example embodiments, this provides for greater differentiation between potential matches as compared to the approximately equal distribution of comparison fingerprints shown in FIG. 4.

FIG. 6 is a flowchart illustrating a process 600, in some example embodiments, for indexing fingerprints. By way of example and not limitation, the operations of the process 600 are described as being performed by the media identification system 145 and modules 150 and 160 of FIG. 1.

In operation 610, the media identification system 145 receives a media identification query that includes a query fingerprint. For example, the client device 125 may have generated a query fingerprint based on media detected by or played by the client device 125. In this example, after generating the query fingerprint, the client device 125 sends a query for identification of the fingerprinted media over the network 135 to the media identification system 145. In some example embodiments, the client device 125 interacts with an intermediary server. For example, the client device 125 may send a request that includes the fingerprint to a service that provides song lyrics. In response, a server of the service may send a request to the media identification system 145 for identification of the media. Once the service has received an identifier for the media, the service can look up information regarding the media and provide that information to the client device 125.

The media identification system 145 performs a first-pass match of the query fingerprint against a fingerprint database (operation 620). For example, the first pass module 150 may perform operations 730-780 of the process 700, described in more detail below.

In operation 630, the media identification system 145 selects a set of possible matches for second-pass processing based on the results of the first-pass processing. In some example embodiments, the first-pass processing provides a number of possible reference matches along with corresponding BERs. Some or all of the possible reference matches are selected for second-pass processing. For example, the possible references may be sorted to identify the possible reference matches having the lowest BERs. A predetermined number of the possible references may be selected. For example, 1024 possible references may be generated and the 256 possible references having the lowest BERs of the 1024 possible references may be selected for second-pass processing. Alternatively, a BER threshold may be applied. For example, each possible reference with a BER below 10% may be selected. These criteria may be combined, such that to be selected a reference must both be in the top 25% of lowest BERs and the BER must be below 35%. Other thresholds may also be used for both criteria (e.g., top 50% of lowest BERs, a BER below 40%, or any suitable combination).

The media identification system 145 performs a second-pass match of the query fingerprint against the selected references (operation 640). For example, the second pass module 160 may compare each possible 4× subsampled version of the query fingerprint against every 4× subsampled reference fingerprint of the selected references. The second-pass match may be divided between multiple devices, each of which accesses a portion of the reference fingerprints. For example, four servers may each store one fourth of the reference fingerprints. In this example, each server is tasked with determining the quality of the matches of the selected reference fingerprints stored on that server with the query fingerprint.

In operation 650, the media identification system 145 provides a response to the query, based on the results of the second-pass processing. For example, the reference fingerprint resulting in the lowest BER among all reference fingerprints tested in the second-pass processing may be provided in response to the query. In some example embodiments, if the lowest BER exceeds a predetermined value (e.g., 5%, 10%, 35%, 40%, or some other value), the media identification system 145 responds to the query with an indication that no match could be found. When a match is found, the value returned may be a numeric identifier of the matching media, a time within the media of the match, a string identifier of the matching media, another identifier or value, or any suitable combination thereof.

FIG. 7 is a flowchart illustrating a process 700, in some example embodiments, for indexing fingerprints. By way of example and not limitation, the operations of the process 700 are described as being performed by the media identification system 145 and the first pass module 150 of FIG. 1.

In operation 710, the media identification system 145 or another server divides the reference data into segments. For example, segments containing 226 sub-fingerprints may be used. For processing, each segment may be divided into chunks. For example, the segment may be divided into 8192 chunks of 8192 positions each. A portion of the reference data is assigned to a device, in operation 720. For example, in embodiments in which 1.6 trillion 32-bit sub-fingerprints are stored, the total reference data is approximately 6 terabytes of data. Dividing the data among individual servers having approximately 100 GB of RAM allows complete coverage of the reference data using 60 servers. In various example embodiments, the division is at various hardware levels. For example, a single server may have multiple graphics cards installed, each of which has separate physical memory. Accordingly, the separate segments may be installed onto different components of a single server. In other example embodiments, each segment is installed on a different server.

In some example embodiments, the data storage requirements are reduced by sub-sampling the sub-fingerprints. For example, by storing only every fourth or every thirty-second sub-fingerprint, the storage requirements are reduced by a factor of four or thirty-two. Accordingly, a segment of $2^{26}$ 32-bit fingerprints that consumes 228 bytes (256 MB) when fully sampled consumes only 64 MB at 4× sub-sampling and 8 MB at 32× sub-sampling. Continuing with this example, a device with 4 GB of memory would store up to 512 segments at 32× sub-sampling. In practice, a portion of the memory may be used to store instructions or other data, reducing the number of segments that can be stored.

In some example embodiments, the reference data is reduced in size. For example, rather than attempting to match against every song ever made, the 10% of known music that is most well-known or widely distributed may be used. The reference data may be divided among more than the minimum number of servers to increase the degree of parallel processing. Additionally, a particular query may be searched against a particular portion of the reference segments with a proportional increase in speed. For example, if the full reference data set contains fingerprints for all cable TV channels and a particular second-screen application is only interested in determining when audio for a particular channel can be heard, only the portion of the reference data set containing fingerprints for that particular channel needs to be searched.

In operation 730, the media identification system 145 provides a query fingerprint to each device. The query fingerprint may be a fingerprint received in operation 610 of FIG. 6. Each device processes the query fingerprint in parallel, for example by performing the operations 740-760.

In operation 740, each device creates one or more thread groups, each group comprising multiple threads. For example, warps of 32 threads each may be used. Warps may be grouped into blocks (e.g., blocks of 32 warps having a total of 1024 threads). An individual GPU may have many cores, allowing multiple blocks to be run simultaneously. Additionally, an individual hardware device, such as a graphics card, may have many GPUs. Accordingly, in an example embodiment, 2 GPUs, each running 32 blocks of 1024 threads, are used, providing 65,536 threads.

Each thread accesses a portion of the segment on the device (operation 750). In some example embodiments, each thread accesses two non-contiguous sub-fingerprints (e.g., two sub-fingerprints that are four values apart or two sub-fingerprints that are two values apart) and shares the accessed values with other threads in the same warp.

In operation 760, each thread compares a portion of the query with a portion of the reference data and stores the best results. Additional details regarding the operation 760, in some example embodiments, are provided below with respect to FIG. 8.

In operation 770, the best results among each thread group are aggregated and evaluated to further identify the best results overall. For example, each thread may store the best six BERs observed by that thread, identifying the six positions in the reference data (one position corresponding to one scan, as discussed with respect to FIG. 8) for which each thread observed the best results. Accordingly, if 8192 threads are used, 49,152 positions in the reference data are identified for further evaluation.

The identified positions are evaluated by applying the full query fingerprint, with appropriate sub-sampling. For example, with a 512 sub-fingerprint query sub-sampled 4× being compared against 32× sub-sampled reference data, 16 comparisons are made to determine the BER.

The evaluation process may be performed in parallel. For example, 2816 threads in 88 warps may be used, with each thread processing approximately 18 locations. The best two values for each thread of the eighteen evaluated are stored by the thread. Using a pair of bitonic sorts, one ascending and the other descending, the 64 values of each warp are sorted. The 32 best BERs are distributed amongst the 32 threads so that each thread contains one of the 32 best BERs.

In operation 780, the returned values from the threads are accessed and sorted by BER. A predetermined percentage (or number) of candidates is retained. The retained candidates are sorted by position in the reference data. Each candidate is checked using lower sub-sampled data (e.g., 4×). The candidate is checked at its indicated position as well as nearby positions. For example, the four positions before and after the indicated position may be checked. In some example embodiments, operation 780 is performed on a CPU and corresponds to operation 640 of FIG. 6. Candidates having BERs below a predetermined threshold are retained.

The candidates retained in operation 780 are combined across all devices in operation 790. The combined set of candidates are returned in response to the query as possible matches. For example, if the reference data set comprises 16,384 segments and each device processes 512 segments, 32 devices will identify candidates having desired BERs. Accordingly, the results from the 32 devices are combined to generate the set of possible matches.

Figure 8:
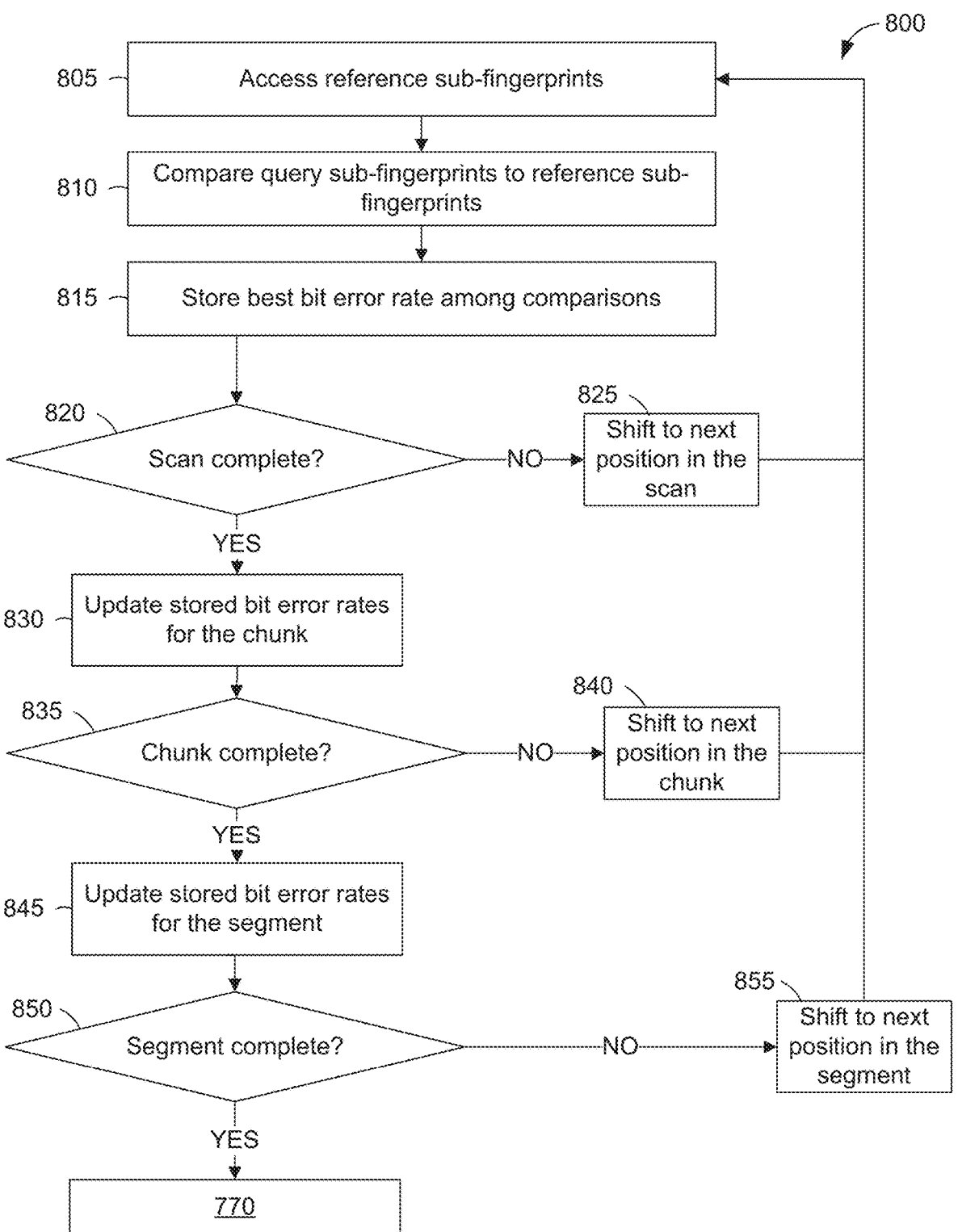
FIG. 8 is a flowchart illustrating a process, in some example embodiments, for indexing fingerprints.

FIG. 8 is a flowchart illustrating a process 800, in some example embodiments, for indexing fingerprints. The process 800 implements the operation 760, in some example embodiments. By way of example and not limitation, the operations of the process 800 are described as being performed by the media identification system 145 and threads of the first pass module 150 of FIG. 1. The operations of the process 800 are, in some example embodiments, performed simultaneously by all of the thread groups created on the device(s) in operation 740.

In operation 805, the thread accesses sub-fingerprints of the reference. The particular sub-fingerprints accessed depend on the thread. For example, with reference to FIG. 3, 1024 threads may access 1024 sequential sub-fingerprints, two per thread. Through inter-thread communications (such as shared memory or warp shuffling), each thread accesses the sub-fingerprints between the two accessed by the thread. Each thread accesses three (for a query of 256 sub-fingerprints) or five (for a query of 512 sub-fingerprints) reference sub-fingerprints. For example, thread 0 accesses sub-fingerprints 0-4, thread 1 accesses sub-fingerprints 1-5, and so on.

The thread compares query sub-fingerprints to its reference sub-fingerprints (operation 810). The query sub-fingerprints used are selected to align with the reference sub-fingerprints. For example, if the reference sub-fingerprints are sub-sampled 32× and the query sub-fingerprints are sub-sampled 4×, then query sub-fingerprints spaced eight positions apart will be compared against adjacent reference sub-fingerprints. In a single iteration, one possible match is checked by each thread by comparing three or five sub-fingerprints of the reference. The lowest single BER is considered to be the BER of the comparison.

In operation 815, if the result is the lowest BER observed in this scan, it is kept. Otherwise, the result is discarded in favor of the previously-obtained lowest BER for the scan.

After the threads have evaluated the degree of match between the query and the reference at a single position, the scan continues by applying a different set of query sub-fingerprints to the position (operation 825) if the scan is not yet complete (operation 820). In some example embodiments, nine iterations are used to complete a scan. In each iteration, a different portion of the query fingerprint is used, such that the full range of the fingerprint is applied against the positions of the reference data assigned to the thread. For example, in a fully sampled query fingerprint of 256 sub-fingerprints applied against 32× sub-sampled reference data, the first iteration may use sub-fingerprints 127, 159, 191, 223, and 255, the ninth iteration uses sub-fingerprints 0, 32, 64, 96, and 128 and the intervening seven iterations use intermediate values.

Once the scan is complete (operation 820), operation 825 is performed. In operation 725, if the result for the scan is amongst the top n BERs (e.g., the best two BERs) seen by this thread in this chunk, the BER value and starting position for the comparison are stored in the thread (e.g., in registers). By way of example, the starting position of the comparison may be an identifier corresponding to the dashed line shown in FIGS. 5-6 for a particular scan.

In operation 840, processing continues with the next scan in the chunk, unless the chunk is complete (operation 835). For example, eight scans may comprise a chunk. Accordingly, once the 1024 threads have completed parallel processing of the first 1024 sub-fingerprints of the reference data, the threads are directed to process the next 1024 sub-fingerprints. In some example embodiments, synchronization is performed at the warp level instead of the block level. In these example embodiments and using the aforementioned block size of 1024 threads, once a warp has completed parallel processing of its 32 sub-fingerprints of the reference data, the warp is directed to process the 32 sub-fingerprints at a position 1024 locations farther along.

Once the chunk is complete (operation 835), the stored bit error rates for the segment are updated (operation 845). For example, the six best BERs observed across all threads in the warp for the segment may be stored (e.g., in shared memory) along with an identifier of the address for the position of the scan in which the BER was observed.

If the segment is not yet complete (operation 850), processing continues by shifting to the next chunk in the segment (operation 855). For example, 8192 locations may comprise a chunk and 256 chunks may comprise a segment. Since in the last iteration of a chunk, the threads are already processing the end of the chunk, shifting to the beginning of the next chunk may be implemented by applying the same procedure as shifting to the next scan in a chunk. That is, the threads in the block are directed to access the next 1024 sub-fingerprints of the reference.

In operation 850, if processing of the segment is complete, process 700 continues with operation 770.

According to various example embodiments, one or more of the methodologies described herein may facilitate indexing fingerprints. Accordingly, one or more of the methodologies described herein may obviate a need for certain efforts or resources that otherwise would be involved in indexing fingerprints. Computing resources used by one or more machines, databases, or devices (e.g., within the network environment 100) may be reduced by using one or more of the methodologies described herein. Examples of such computing resources include processor cycles, network traffic, memory usage, data storage capacity, power consumption, and cooling capacity.

Hash table lookups may provide efficient fingerprint matching when the BER is low. For example, when exact matching is expected, a hash of the query fingerprint corresponds to a small number of potential matches. Using the hash, the potential matches are identified and then the potential matches are compared to identify the actual match. However, if a single bit can be wrong, the number of hashes for the query fingerprint is not one, but rather the number of bits of the query fingerprint. As the BER increases, the number of hashes that need to be generated and checked increases exponentially. Accordingly, when the BER is sufficiently large, a brute force comparison of the query fingerprint against all possible matching fingerprints is faster than calculating a large number of hashes to identify a large subset of the reference fingerprints and then checking the query fingerprint against each reference fingerprint in the large subset. The methods and systems presented herein offer substantial speed improvements to existing brute force comparison methods and systems. In addition to reducing the time required to generate a match, memory usage may be reduced, and, by using GPUs to perform comparisons, expensive CPU usage may be reduced.

Figure 9:
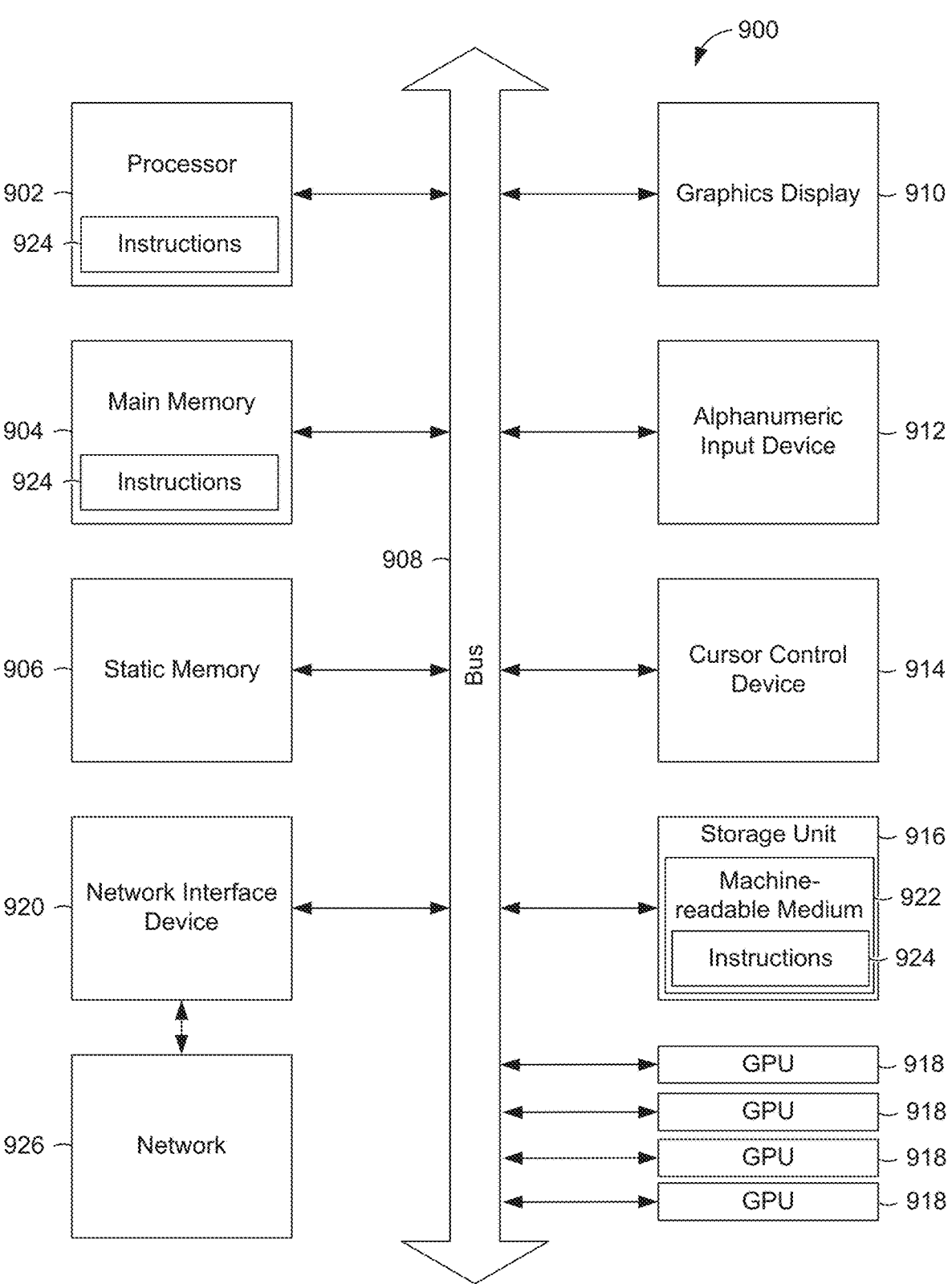
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 9 shows a diagrammatic representation of the machine 900 in the example form of a computer system and within which instructions 924 (e.g., software, a program, an application, an applet, an app, or other executable code) for causing the machine 900 to perform any one or more of the methodologies discussed herein may be executed, in whole or in part. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a PC, a tablet computer, a laptop computer, a netbook, a set-top box (STB), a smart TV, a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an ASIC, a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a LED display, a LCD, a projector, or a CRT). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, one or more GPUs 918, and a network interface device 920.

The storage unit 916 includes a machine-readable medium 922 on which is stored the instructions 924 embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 (e.g., network 135 of FIG. 1) via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 900), such that the instructions, when executed by one or more processors of the machine (e.g., processor 902), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a FPGA or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer-implemented method comprising:
obtaining a query fingerprint comprising a plurality of query sub-fingerprints;
providing the query fingerprint to a plurality of devices, wherein each device in the plurality of devices is associated with a corresponding plurality of segments of reference fingerprints divided from a set of reference fingerprints, wherein each segment includes a plurality of reference sub-fingerprints, wherein each device in the plurality of devices creates one or more thread groups, wherein each thread in the one or more thread groups accesses a portion of an associated segment of reference fingerprints and compares a portion of the query sub-fingerprints with a portion of the reference sub-fingerprints in the accessed portion of the associated segment of reference fingerprints to determine a set of first bit error rates;
identifying a predetermined number of lowest bit error rates based on aggregating the set of first bit error rates determined by each thread in the one or more thread groups, wherein each of the predetermined number of lowest bit error rates corresponds to a reference fingerprint of the set of reference fingerprints;
in response to identifying the predetermined number of lowest bit error rates, for each reference fingerprint of the reference fingerprints corresponding to the predetermined number of lowest bit error rates, determining a second bit error rate by comparing the query fingerprint with the reference fingerprint;
in response to determining the second bit error rate for one or more of the reference fingerprints corresponding to the predetermined number of lowest bit error rates, determining at least one response candidate based on the second bit error rates; and
providing the at least one response candidate in a response to a query including the query fingerprint.

2. The computer-implemented method of claim 1, further comprising down-sampling the segments of reference fingerprints at a first down-sampling rate for a first comparison pass.

3. The computer-implemented method of claim 1, further comprising storing the predetermined number of lowest bit error rates.

4. The computer-implemented method of claim 1, wherein each segment of reference fingerprints is divided into one or more chunks, wherein each thread group is associated with a chunk of the one or more chunks.

5. The computer-implemented method of claim 1, wherein each thread group forms a warp.

6. The computer-implemented method of claim 2, further comprising down-sampling the segments of reference fingerprints at a second down-sampling rate for a second comparison pass.

7. The computer-implemented method of claim 6, wherein the first down-sampling rate is greater than the second down-sampling rate.

8. A tangible, non-transitory computer readable medium comprising instructions that, when executed, cause at least one processor to perform a set of operations comprising:
obtaining a query fingerprint comprising a plurality of query sub-fingerprints;
providing the query fingerprint to a plurality of devices, wherein each device in the plurality of devices is associated with a corresponding plurality of segments of reference fingerprints divided from a set of reference fingerprints, wherein each segment includes a plurality of reference sub-fingerprints, wherein each device in the plurality of devices creates one or more thread groups, wherein each thread in the one or more thread groups accesses a portion of an associated segment of reference fingerprints and compares a portion of the query sub-fingerprints with a portion of the reference sub-fingerprints in the accessed portion of the associated segment of reference fingerprints to determine a set of first bit error rates; identifying a predetermined number of lowest bit error rates based on aggregating the set of first bit error rates determined by each thread in the one or more thread groups, wherein each of the predetermined number of lowest bit error rates corresponds to a reference fingerprint of the set of reference fingerprints;
in response to identifying the predetermined number of lowest bit error rates, for each reference fingerprint of the reference fingerprints corresponding to the predetermined number of lowest bit error rates, determining a second bit error rate by comparing the query fingerprint with the reference fingerprint;
in response to determining the second bit error rate for one or more of the reference fingerprints corresponding to the predetermined number of lowest bit error rates, determining at least one response candidate based on the second bit error rates; and
providing the at least one response candidate in a response to a query including the query fingerprint.

9. The tangible, non-transitory computer readable medium of claim 8, wherein the set of operations further comprises down-sampling the segments of reference fingerprints at a first down-sampling rate for a first comparison pass.

10. The tangible, non-transitory computer readable medium of claim 8, f wherein the set of operations further comprises storing the predetermined number of lowest bit error rates.

11. The tangible, non-transitory computer readable medium of claim 8, wherein each segment of reference fingerprints is divided into one or more chunks, wherein each thread group is associated with a chunk of the one or more chunks.

12. The tangible, non-transitory computer readable medium of claim 8, wherein each thread group forms a warp.

13. The tangible, non-transitory computer readable medium of claim 9, wherein the set of operations further comprises down-sampling the segments of reference finger-prints at a second down-sampling rate for a second comparison pass.

14. The tangible, non-transitory computer readable medium of claim 13, wherein the first down-sampling rate is greater than the second down-sampling rate.

15. A computing device comprising:

at least one processors; and tangible, non-transitory computer readable medium comprising instructions that, when executed, cause the at least one processor to perform a set of operations comprising:

obtaining a query fingerprint comprising a plurality of query sub-fingerprints;

providing the query fingerprint to a plurality of devices, wherein each device in the plurality of devices is associated with a corresponding plurality of segments of reference fingerprints divided from a set of reference fingerprints, wherein each segment includes a plurality of reference sub-fingerprints, wherein each device in the plurality of devices creates one or more thread groups, wherein each thread in the one or more thread groups accesses a portion of an associated segment of reference fingerprints and compares a portion of the query sub-fingerprints with a portion of the reference sub-fingerprints in the accessed portion of the associated segment of reference fingerprints to determine a set of first bit error rates;

identifying a predetermined number of lowest bit error rates based on aggregating the set of first bit error rates determined by each thread in the one or more thread groups, wherein each of the predetermined number of lowest bit error rates corresponds to a reference fingerprint of the set of reference fingerprints;

in response to identifying the predetermined number of lowest bit error rates, for each reference fingerprint of the reference fingerprints corresponding to the predetermined number of lowest bit error rates, determining a second bit error rate by comparing the query fingerprint with the reference fingerprint;

in response to determining the second bit error rate for one or more of the reference fingerprints corresponding to the predetermined number of lowest bit error rates, determining at least one response candidate based on the second bit error rates; and providing the at least one response candidate in a response to a query including the query fingerprint.

16. The computing device of claim 15, wherein the set of operations further comprises down-sampling the segments of reference fingerprints at a first down-sampling rate for a first comparison pass.

17. The computing device of claim 15, wherein each segment of reference fingerprints is divided into one or more chunks, wherein each thread group is associated with a chunk of the one or more chunks.

18. The computing device of claim 15, wherein each thread group forms a warp.

19. The computing device of claim 16, wherein the set of operations further comprises down-sampling the segments of reference fingerprints at a second down-sampling rate for a second comparison pass.

20. The computing device of claim 19, wherein the first down-sampling rate is greater than the second down-sampling rate.

* * * * *